United States Patent Office 3,403,084
Patented Sept. 24, 1968

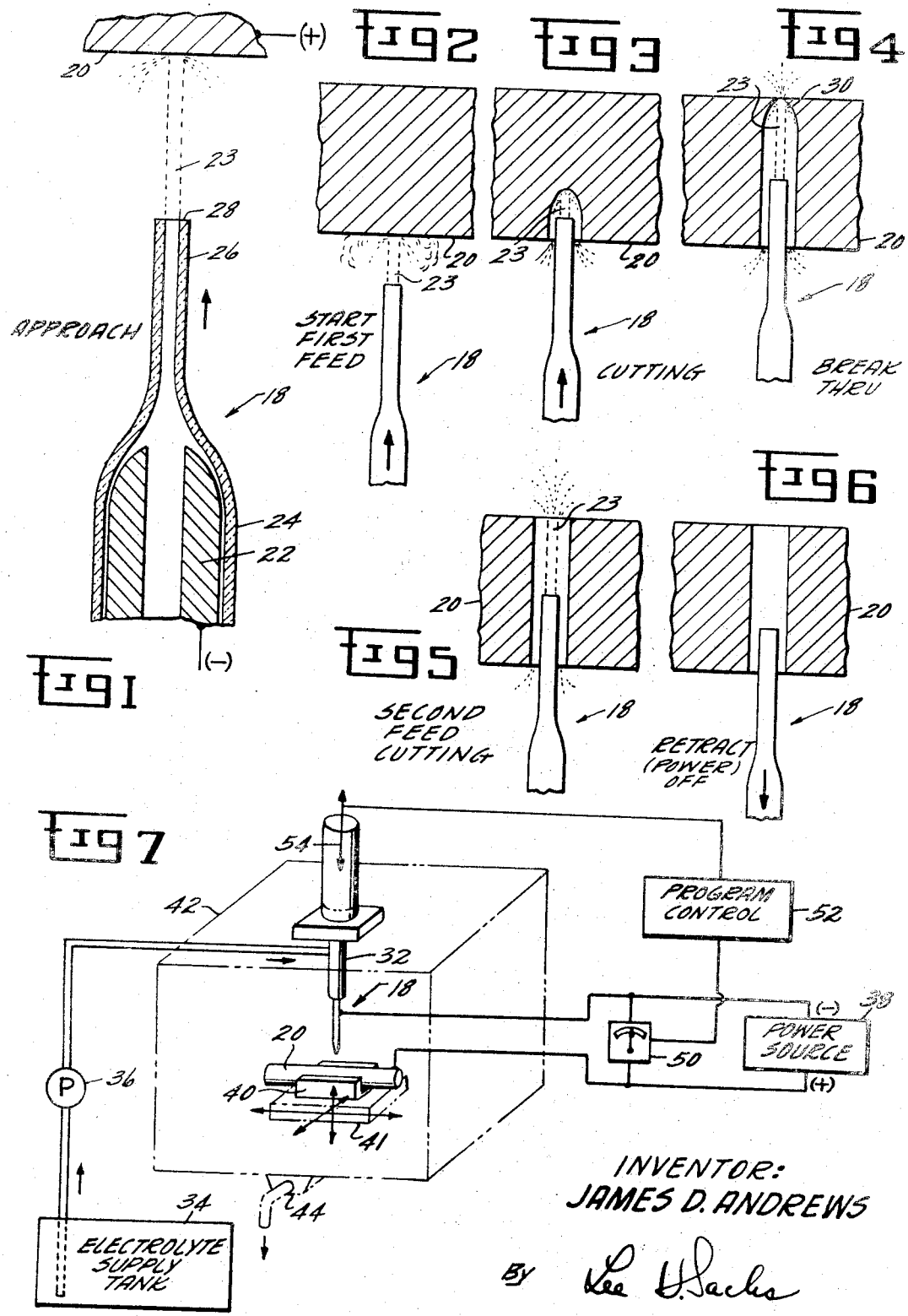

3,403,084
ELECTROLYTIC MATERIAL REMOVAL WHEREIN THE CURRENT-VOLTAGE RELATIONSHIP IS IN THE "KELLOGG REGION"
James D. Andrews, Cincinnati, Ohio, assignor to General Electric Company, a corporation of New York
Filed July 26, 1965, Ser. No. 474,833
5 Claims. (Cl. 204—143)

This invention relates to an electrolytic method and apparatus. More particularly, it relates to an improved electrolytic method and apparatus for the accurate, rapid and practical removal of electrically conductive material from a workpiece, such as in the production of small holes in an electrically conductive workpiece.

There has been an expanding development and use of difficult-to-work or difficult-to-machine materials such as the refractory metal alloys and the iron base, nickel base or cobalt base alloys, sometimes referred to as superalloys because of their high strength at elevated temperatures. Such use has brought about increased emphasis on material removal methods and apparatus involving the use of electrical energy. One such method is sometimes referred to as electrochemical machining. In its most widely used form, electrochemical machining involves the use of a cathode-tool placed opposite an anodic workpiece. Liquid electrolyte is then placed between the tool and the workpiece wetting both the cathode surface of the tool and the appropriate workpiece surface. The application of predominantly direct current electrical energy between such electrodes across a relatively narrow gap brings about a "deplating" or "etching" type action on the anodic workpiece. Shapes ranging from gentle contours to deep cavities can be produced depending to a great extent on the shape and size of the cathode-tool, the spacing and the feed rate of the tool with respect to the workpiece and the amount of electrical energy applied through the electrolyte interface.

One specific application of electrochemical machining is the production of a long narrow hole by the selective removal of material from a workpiece. This involves the use of a cathode-tool in the form of an electrically conductive tube, the outer surface of which is electrically non-conductive except for a tip area. Electrolyte is made to pass through the tube wetting both the tip of the tube and the workpiece. As electrical energy is applied and the tube is fed toward and into the workpiece, a focused etching of the workpiece can be made to occur. The cathode-tube is usually electrically conductive, yet it preferably has a dielectric surface on its outer portion to form a barrier to the passage of electrical current from the tube to the electrically conductive side walls of the cavity being produced in the workpiece. Therefore, because of the need to operate across a narrow gap between cathode and workpiece and because of the need for certain electrical insulation, there is a practical lower size limitation on the production by this method of deep cavities, such as holes. Holes having a diameter of about 0.05" or less are very difficult to make and control and are economically impractical using such a cathode. Producing holes of 0.02" or less with this known process and known apparatus presents many technical problems.

Another approach to removing material from a workpiece by electrochemical action involves the use of a stream of electrolyte charged cathodically by direct current and directed at and wetting the selected anodic workpiece surface to remove material from that surface. Typical embodiments of this approach are shown in U.S. Patents 2,741,594—Bowersett, issued Apr. 10, 1956, and 2,767,137—Evers, issued Oct. 16, 1956, and are discussed in Electrochemical Technology, vol. 1, No. 7–8, July–August 1963, pp. 203–211. With these types of arrangements, the rate of material removal has been slow because, among other reasons, there has been a lack of critical control of gaps between the electrodes even at high voltages.

It is a principal object of this invention to provide an improved electrolytic method for accurately removing material from a selected portion of an electrically conductive workpiece at a rapid rate practical for production.

Another object is to provide an improved electrolytic method for rapidly and accurately producing small diameter holes or narrow cavities, in or through electrically conductive materials.

Still another object is to provide improved apparatus for the rapid and efficient production of such small diameter holes or narrow cavities.

These and other objects and advantages will be more clearly understood from the following detailed description, drawing and specific examples which are meant to be exemplary of rather than any limitation on the scope of the present invention.

In the drawing:

FIG. 1 is a fragmentary, sectional view of a workpiece and a tool, including an electrode at the start of operation;

FIGS. 2–6 are fragmentary, partially sectional views of the tool and workpiece during various steps in the method of this invention; and FIG. 7 is a partially diagrammatic view of one form of the apparatus of the present invention.

In accordance with the present invention, there has been provided an improved electrolytic material removal method in which the electrical power input is selected so as to produce certain critical electrical conditions for the conducting of the material removal. Specifically, in the improved method, a power input is selected which will produce in the electrolyte contacting the workpiece a condition wherein the current-voltage relationship therein is in the "Kellogg region" (infra) and manifested at least as an incipient glow through a well defined glow in the electrolyte. It has been found that under these conditions of this invention, the rate and amount of material removed from a workpiece is unexpectedly greater than can be anticipated from Faraday's Law combined with the amount of chemical attack on the workpiece material to be expected from the electrolyte used. In a more specific form such as for producing 0.05" or less diameter holes, such a method employs an electrolyte directing means in the form of a dielectric tube such as of glass and terminating in a capillary nozzle. The nozzle propels a stream of charged electrolyte toward a workpiece while a potential of at least about 300 volts is impressed between the workpiece and the electrode which herein is called a cathode. Electrical power through the electrolyte is sufficient to maintain at least an incipient glow in the electrolyte stream.

As pointed out above, the term "incipient glow" in the electrolyte refers to the condition in the electrolyte between a cathode and an anode at which the current density is greater than that which produces the quiet evolution of gas bubbles in direct current electrolysis but is in the range of the "transition region," reported by Kellogg in the Journal of the Electrochemical Society, 1950, 97, 133–142. At the point at which an incipient glow is observed in the electrolyte, the current decreases with increasing voltage, whereas prior to the incipient glow discharge current increases linearly with increasing voltage. At the incipient glow, vapor begins to form at the anode surface and the formation of the characteristic bubbles normally formed in electrolysis at that area ceases. The range from this point of power application through the electrolyte up to the level at which a visual glow can be observed is sometimes designated as the "Kellogg region" and is used herein to refer to the conditions in the electrolyte which cause at least an incipient glow therein as it applies to electrolytic material removal. Further into this region, the current is low and generally constant as voltage is increased.

A preferred apparatus for carrying out the present invention includes means for directing a selective stream of electrolyte toward a workpiece. Further it includes electrical means for charging the electrolyte stream negatively, at least part of the time, with respect to the workpiece and for providing electrical power between the workpiece and the directing means sufficient to create and maintain at least an incipient glow in the electrolyte stream.

As will be shown in detail later, ordinary alternating current at high voltage can be used in the practice of the present invention with approximately the same depth of penetration rate but at about half the total volume of material removal compared with the use of direct current and with very little effect on the energizing electrode. Therefore, although the workpiece need not always be continually anodic and the electrode which charges the electrolyte need not always be continually cathodic, they are for simplicity in this specification sometimes referred to as the cathode and the anodic-workpiece.

A more specific form of the apparatus of the present invention in one of the more widely applicable arrangements includes variable speed feed means to feed the nozzle of a hollow tool, including a cathode and an anodic workpiece one toward the other. The nozzle is preferably made from a dielectric material and has a relatively small diameter opening at the tip opposite the workpiece. Charged electrolyte is directed in a stream or jet from the nozzle tip toward the workpiece. The apparatus includes means capable of applying electrical power between the cathode and the workpiece through the electrolyte sufficient to produce and maintain at least an incipient glow in the electrolyte. The feed means is responsive to an electrical sensing means to sense components of electrical power such as a current sensing means. Such a means can, at a given applied voltage, sense variations in current or rate of current change between the cathode and the workpiece. Thus, in this form, the rate at which the nozzle and the workpiece approach one another is a function of current flow or current rate of change between the cathode and workpiece.

In the special case of the use of the apparatus for producing a hole completely through a workpiece, current sensing means can perform the functions of sensing the approach of the nozzle tip and the workpiece to change a preliminary closing feed to first operating feed such as to avoid damage to the nozzle. Subsequently, when the flow of charged electrolyte breaks through the workpiece, there is a drop in current, an increase in electrical resistance and a decrease in material removal rate. The apparatus can be programmed by a variety of conventional and well known electrical, mechanical or electronic devices to respond to the current sensing means. Such programming can include changing the first operating feed rate to a second operating feed rate or stopping the feed at a given point in order to produce a desired hole uniformly through the workpiece. By appropriate selection of a preliminary closing feed or closing feed sequence prior to the first operating feed, the shape of the cavity mouth and the cavity walls can be controlled.

The process of the glow development in an electrolyte is well known and has been widely studied and reported upon. Some of the chemical changes it brings about in an electrolyte subjected to electrical power treatments producing a glow therein, the treatment of a metal article surface also subjected to an electrolyte in such condition glow discharge and the like have been observed. Although electrochemical etching or material removal employing a stream of cathodically charged electrolyte from a nozzle has been reported, slow rates of removal have been experienced and, in fact are desirable for some applications. The unexpected yet controllable high rates of material removal and workpiece penetration which can be achieved through operation with the electrolyte in a condition so that the electrolyte manifests at least an incipient glow, has not been recognized heretofore.

At and beyond the point at which an incipient glow is effected through the application of direct current, vapor has been observed at the anode-workpiece surface. However, initially such vapor does not prevent electrolytic action from taking place. In early stages the electrolyte continues to wet the workpiece surface intermittently. Hence a means is retained for electrochemical action to take place. As will be shown in more detail later, the amount of material removed from the workpiece surface under these conditions greatly exceeds and cannot be explained by a summation of the amount of material which should be removed according to Faraday's Law with the amount of material which would normally be removed solely by chemical etching from the electrolyte alone. Thus an unexpected substantial increase in rate of material removed has been recognized to exist under conditions of the present invention in an electrolytic material removal process. Such material removal may result from a combination of electrolytic action and highly reactive chemical attack brought about by the high current density conditions.

As the power input of the system is increased to bring the glow farther into the visible region, some increase has been observed in the electrical resistance in the electrolyte at the workpiece. There is an accompanying decrease in metal removal rate at a given voltage, perhaps caused by a thicker vapor film and the greater electrical resistance between the electrolyte and the workpiece surface. Therefore, the method of the present invention in a more preferred form involves the step of conducting an electrolytic material removal process at an electrical potential of at least 300 volts and with a total power input for the apparatus used to produce and maintain at least an incipient glow in the electrolyte between the cathode and workpiece ranging to a point at which voltages up to about 1200 volts are required to produce sufficient current flow between cathode and anode.

More specifically, the present invention contemplates first selecting for the material of the workpiece a suitable electrolyte which resists the production of an electrically resistant film, such as an oxide, on the workpiece during operation. Such selection for specific materials are shown in the examples. Generally the electrolyte in electrolytic material removal processes is an aqueous solution of a salt or of an acid. Acid electrolytes have the advantage of supplementing electrolytic action with possibly some chemical etching and at the same time resist the formation of solids and precipitates during operation. Many suitable electrolyte-workpiece material systems have been studied and reported.

After selection of the electrolyte, it is easily determined experimentally, such as with apparatus of the type shown in FIG. 7, the rates at which the workpiece material can be removed at various electrolyte pressures with the application of voltage and current suitable to maintain at least an incipient glow in the electrolyte between cathode and anode as discussed in Example 4. The particular conditions so determined are associated only with a specific electrically non-conductive nozzle configuration to produce a cavity of a specific shape and size in the particular workpiece material.

From these general data, an electrolyte pressure, an operating feed rate and an applied voltage dictating a current flow for the system are selected to suit production requirements. If equipment cost is significant and high volume is not critical, alternating current can be used. For example, an ordinary 440 volt A.C. line can supply power directly or a step-up transformer can be used. Because the method of the present invention for the production of small holes generally requires a voltage of at least about 300 volts, and usually 400–750 volts, to allow operation at or beyond the point at which the electrolyte glows, and because a current of 4 amps or less, and generally less than 2 amps, per nozzle are required for most applications, the general data for a specific electrolyte-workpiece material-nozzle size combination are easily obtained.

Gaps, though controlled to maintain the required conditions in the electrolyte, are much larger in this process than those used in conventional electrolytic material removal processes where no stream of electrolyte is employed. Therefore, the feed rate can exceed equilibrium conditions for material removal at which material is removed from the workpiece at the same rate as the cathode is fed toward the workpiece. Thus the nozzle can be fed toward the workpiece faster than the workpiece material is removed. However, this greater-than-equilibrium feed rate must be decreased prior to the nozzle contacting the workpiece to avoid nozzle damage or breakage. Frequently breakthrough occurs before that contact point is reached.

FIGS. 1 through 6 show the complete sequence of a method cycle in which the nozzle approaches the workpiece and the intent is to produce a hole through the workpiece. In FIG. 1, electrolyte directing means or nozzle 26 discharging cathodically charged electrolyte is approaching the workpiece 20 at a relatively rapid or closing feed rate because it is not yet within proper distance for operation as sensed by the current flow between the cathode 22 and workpiece 20. When the nozzle reaches an initial point at which significant material removal can occur, such as is shown in FIG. 2, it is at a preselected gap range between cathode and anode which will produce proper operating conditions selected from the preliminary data. Then the feed means which can be an operator observing an ammeter, responsive to the increased electric current flow between the cathode 22 and the anode-workpiece 20 detailed in FIG. 1, feeds the electrolyte directing means or nozzle 26 at a first operating rate through the cutting step of FIG. 3 until breakthrough occurs as shown in FIG. 4. At breakthrough there is a sudden increase in electrical resistance with an accompanying decrease in metal removal rate. Therefore, to avoid driving the tip 28 of the nozzle 26 into shelf 30, the feed rate must be reduced to allow shelf 30 in workpiece 20 to be removed by electrolytic action at a somewhat slower rate until the proper cavity or hole is produced through the workpiece as shown in FIG. 5. Then as is shown in FIG. 6, the tool is retracted and can be moved, if desired to produce another hole in the workpiece.

There is a relatively large distance or gap separating the cathode 22 from the workpiece-anode 20 in the production of small holes, although tip 28 may be close to such workpiece. In addition, the electrolyte stream or jet 23 has a relatively small cross-sectional area. As a result of these conditions, the electrolyte column between cathode and anode has a relatively large electrical resistance. In order to produce sufficient, though small, electrical current to allow material removal to take place with the electrolyte at or above an incipient glow, it has been found that relatively high electrical potentials such as of 300 or more volts are required for the producing of small diameter holes. Current densities such as result from imposing high voltages, for example 400–500 volts with about 0.5 amp for the rapid production of 0.02″ diameter hole with a tool nozzle having an inside diameter of about 0.014″, will cause heating of the electrolyte to the point of vaporization as was discussed before. As a consequence of vaporization and high potential, the electrolyte manifests a visible glow. Thus visual vaporization of the electrolyte may, in many cases, identify the proper operating range. The actual visual glow as it first occurs is difficult to observe accurately except in the dark. However, high speed photography can afford precise observations and identification of the mechanism involved.

The first operating feed is that shown in FIGS. 2 and 3. This feed rate can be continued until the cavity first breaks through the workpiece as shown in FIG. 4. Then the tool is fed at a second operating feed rate required to complete penetration through the workpiece of a desired hole as shown in FIG. 5. In one specific form the second feed rate can be a dwell or stop-feed time.

The second feed rate or dwell time, which will be described in more detail later, is required because it is believed that as breakthrough occurs, the stream of electrolyte expands more freely outside the workpiece causing a pressure drop and a cooling of the electrolyte. As the electrolyte cools, it becomes less conductive than it was when hot as a result of its having been heated by the electric current flow causing the glow phenomenon. Consequently, there is a drop in electric current flow for the particular operating voltage. The cutting rate is significantly decreased so that the method ordinarily requires a different or programmed feed rate.

Apparatus such as shown partially schematically in FIG. 7 can be used to obtain or determine the preliminary data mentioned above as well as to perform, according to this invention, production type electrolytic material removal from a workpiece. In FIG. 7, the tool 18, detailed in FIG. 1, can be mounted in a tool fixture 32 into which electrolyte is fed for passage through the tool from contact with cathode 22 toward the workpiece. The electrolyte can be fed from an electrolyte tank 34 through pump 36 in order to provide desired pressure. The cathode 22 within tool 18 is connected to a high voltage power source 38 such as a 300–750 volt D.C., 4 amp rectifier. However, as will be shown by the examples, standard form A.C. can be used because of lower equipment costs. Workpiece 20, such as a tube or plate in which holes are to be produced, can be held in workpiece holding fixture 40 and is connected as an anode. Holding fixture 40 can be mounted on three dimensional indexing table 41 so that the workpiece 20 can be moved as desired. In order to protect the operators of the apparatus from contact with the electrolyte, an enclosure 42 can be constructed around the apparatus and can include a drain 44 to allow used electrolyte to flow from the enclosure.

An important feature of this specific form of the apparatus of the present invention is that it includes a current sensing means 50, such as an ammeter, connected between the cathode 22 and the workpiece 20 in order to sense current flow and current rate of change. In this way, the gap between the cathode 22 and workpiece 20 can be sensed to maintain the power flow through the electrolyte at the desired level. Data from the current sensing means 50 can be observed by an operator who then can manually control or adjust feed rate or the data can be passed through a program control means 52 which includes a particular program pattern as a function of changes in current. The program control means 52, which is made from well known and commercially available timing and switching devices, in turn changes the speed or feed direction of variable and reversible tool feed means 54 driven by a variable speed motor (not shown). If desired, the tool can remain stationary and the workpiece can be moved. The direction at which the tool and workpiece approach one another does not affect the method of the present invention.

In order to avoid the cathode size limiting the size of the hole or cavity being produced, the actual cathode 22 in FIG. 1, which imparts a cathodic charge to the electrolyte, is maintained at a substantial yet controlled distance away from the workpiece 20 as shown in FIG. 1. In this way, the nozzle 26 of the tool can be made very small to enable it to penetrate into the workpiece and still allow room for the electrolyte to flow around it and out of the hole after it has left the nozzle tip 28. The distance between cathode 22 and workpiece 20 is maintained as small as possible to reduce the resistance in the electrolyte between the cathode and the anode and reduce the power required to maintain at least an incipient glow in the electrolyte stream 23. Nevertheless, the actual cathode 22 need not penetrate the workpiece. The distance at which it is maintained away from the workpiece is dictated by the length of the nozzle 26 required to produce the desired cavity or hole. As electrolyte passes around or through the cathode within the tool, the electrolyte obtains its electrical charge. In a preferred form, the cathode is an electrically conductive tube 22 in FIG. 1, such as of a nickel base alloy sometimes referred to as Hastelloy C alloy, housed within an electrically non-conductive tube 24 such as of glass.

Even though the cathode 22 is placed as near as possible to the workpiece 20, relatively high electrical resistance is experienced in the column of electrolyte 23 between the cathode 22 and the workpiece 20 compared with conventional electrochemical material removal processes which operate across relatively small gaps. Consequently, the present invention has recognized that for the production of small holes with cathodes located across a relatively wide gap from the workpiece, the application of higher voltages is required in a range of at least about 300 volts, and preferably in the range of 400–800 volts in order to bring the power input into the range required to produce at least the incipient glow in the electrolyte between the cathode and workpiece, as was defined above. It has been found that the conditions desired in the practice of the present invention can be achieved with up to about 4 amps per nozzle, although up to 10 amps per nozzle has been used occasionally. Generally less than about 2 amps per nozzle is used depending upon the diameter and length of the column of electrolyte within nozzle 26 between the workpiece and the cathode.

The present invention will perhaps be more fully understood and appreciated in connection with the foregoing remarks by reference to the following detailed examples. These are meant to be exemplary of rather than any limitation on the scope of the present invention.

As was discussed above, practice of the method of the present invention of operating with the electrolyte in a condition which causes the electrolyte to glow at least incipiently results in the removal of material from the workpiece in amounts greater per unit of time than could be expected from calculations using Faraday's Law combined with any chemical attack to be expected from reaction between the electrolyte and the workpiece material. The following Table I is typical of the tests performed within the range of the present invention and the results obtained confirming this unusual occurrence. In that table, an electrolyte of a 3 N aqueous solution of hydrochloric acid at room temperature was used with a nozzle having an inside diameter of 0.007″ at a gap between the tip of the nozzle and the workpiece of 0.020″.

TABLE I

| Example | d.c. Volts | Milliamps | Time (sec.) | Wkpc. Mat'l. | Actual Material Removed (mg.) | Faraday's | n |
|---|---|---|---|---|---|---|---|
| 1 | 350 | 57 | 60 | Ni | 1.8 | $3.5 \times 10^{-5}$ | 1.1 |
| 2 | 300 | 47 | 60 | Ni | 1.9 | $2.9 \times 10^{-5}$ | 0.9 |
| 3 | 450 | 135 | 228 | Ni alloy [1] | 5.9 | $3.2 \times 10^{-4}$ | 3.2 |

[1] IN 100 alloy: Nominal wt. percent: 0.18 C; 9.5 Cr; 4.25 Ti; 5.50 Al; 0.06 Zr; 15 Co; 3 Mo; 0.9 V; 0.02 B; Bal. Ni.

In the above table, "$n$" in the last column is the theoretical amount of material in milligrams which should be removed according to Faraday's Law. Examples 1 and 2 represent two electron change reactions each and Example 3 represents a three electron change reaction. In Example 1, the time of 60 seconds was made up of four 15 second bursts using a different site for each burst. The chemical etching effect of a 3 N solution of hydrochloric acid on pure nickel or the nickel base superalloy is considered to be negligible for the times involved.

As can be recognized from these three typical examples, the actual weight loss exceeds by an unexpectedly large amount that which might be expected from Faraday's Law plus the amount of chemical attack to be expected between the electrolyte and the nickel or the nickel base alloy workpiece material. All of the tests in Table I were conducted with direct current and with the electrolyte between the electrodes in the required condition which may be determined by the observation visually of at least an incipient glow in the electrolyte.

EXAMPLE 4

Another series of tests were conducted with the electrolyte in a condition just below the threshold of glow discharge and then just above that at which an incipient glow may be observed visualy and then with the electrolyte in a condition just beyond that at which an incipient glow may be observed visually by adjusting the gap between the cathode and the workpiece. In these examples, the workpiece was a $\frac{1}{16}$″ thick specimen of a nickel base superalloy sometimes referred to a Raney 41 nickel base alloy and having a nominal composition by weight of 19% Cr; 0.006% B; 11% Co; 9.75% Mo; 3.15% Ti; 1.5% Al; 0.12% (max.) C; with the balance Ni. The electrolyte was a 3 N solution of sulfuric acid. The voltage with direct current was maintained at 350 volts with no tool feed toward the workpiece. The time required to cut through the specimen with the electrolyte in a condition just before an incipient glow may be observed and thus outside the scope of the present invention, was 130 seconds. When the electrolyte was placed in a condition above which an incipient glow may be observed by critical adjustment of power input through gap control, the time required to cut through the specimen was 90 seconds. Thus again it was observed that a greater dissolution for the same or less total energy input was achieved through the practice of the present invention than is present in normal electrolysis employing a stream of cathodically charged electrolyte.

During the development, evaluation and testing of the present invention, over 2400 small diameter holes were produced in a variety of workpiece materials. Typical of the types of conditions evaluated are those shown in the examples of the following Table II each of which is a summary of a series of samples.

TABLE II

| Example | Alloy | Hole Diam. (in.) | Nozzle I.D. (in.) | Nozzle Length (in.) | Gap (in.) | d.c. volts | Feed Rate (in./min.) | Pressure (p.s.i.g.) | Avg. Dwell (sec.) | Max. amps |
|---|---|---|---|---|---|---|---|---|---|---|
| 5 | A | .020–.022 | .014 | .400 | .08 | 360–400 | .05–.06 | 65 | 7 | .47 |
| 6 | A | .025–.028 | .014 | .400 | .08 | 540–560 | .05–.06 | 65 | 7 | .57 |
| 7 | B | .013–.019 | .008 | .400 | .1 | 440 | .14–.16 | 60 | 6 | .24 |
| 8 | B | .055–.065 | .03 | (¹) | (¹) | 375–525 | (²) | 30 | 35 | 1.8 |
| 9 | B | .031–.035 | .02 | .400 | .14 | 600 | .12 | 50 | 10 | 1.2 |
| 10 | C | .006–.008 | .004 | .400 | .03 | 440 | .10 | 90 | -------- | .07 |

¹ Set by part, no feed.  ² None.

In the above table, alloy A, sometimes known as IN 102 alloy, had the nominal composition, by weight, of 0.1% (max.) C; 15% Cr; 3% Cb; 3% Mo; 3% W; 7% Fe; 0.5% Al; 0.6% Ti; 0.006% B; with the balance Ni and incidental impurities; alloy B, sometimes referred to as U 700 alloy, had a nominal composition, by weight, of 15% Cr; 3.25% Ti; 0.025% B; 4.25% Al; 17% Co; 5% Mo; 0.015% (max.) C with the balance nickel and incidental impurities; and alloy C, sometimes referred to as Hastelloy C, had the nominal composition, by weight, of 15.5% Cr; 16% Mo; 3.75% W; 5.5% Fe; 0.08% (max.) C; with the balance essentially nickel and incidental impurities. The electrolyte used with alloys A and B was a sulfuric acid aqueous solution at a concentration of about 172 grams per liter and the electrolyte used with alloy C was a hydrochloric acid aqueous solution at a concentration of 148 grams per liter. The gap shown in Table II is the gap between the workpiece 20 and the tip 28 of a glass nozzle 26 such as that shown in FIG. 1.

It is to be noted that the method of this invention can be practiced without feed of the nozzle toward the workpiece as shown in Example 8. In this example, the holes were relatively large, being as great as .065".

Photomicrographic studies of the holes produced by the present invention showed that there is virtually no metallurgical effect from the practice of the present invention and no recast material at the wall of the cavity, such as is found with the processes involving arc discharge through a dielectric fluid, sometimes referred to as electrodischarge machining.

EXAMPLE 11

Apparatus of the type shown in FIG. 7 was used in this example. A workpiece of a material consisting essentially of, by weight, 0.18% C; 9.5% Cr; 4.25% Ti; 5.50% Al; 0.06% Zr; 15% Co; 3% Mo; 0.9% V; 0.02% B with the balance Ni and incidental impurities, sometimes referred to as IN 100 nickel base alloy, was selected because of the difficulty in producing fine holes in such a material by conventional means or by other electrolytic material removal processes. An aqueous acid electrolyte having a composition of 14 weight percent HCl was selected for use. A glass nozzle of the type shown in FIG. 1 and having an inside diameter of 0.005 and a nozzle length of 0.400 inch was made and used with this material, electrolyte and apparatus to determine the proper conditions for feed rate, voltage, current and electrolyte flow to operate with at least an incipient glow.

In this case, the operating conditions were 200 milliamps, 450 volts D.C. with an electrolyte pressure of 90 p.s.i. and a nozzle feed rate of 0.15"/min.

The nozzle which was positioned opposite the workpiece as shown in FIG. 1, was fed toward the workpiece at a feed rate of 0.40"/min. The cathode 22 inside the tube 24 charged the electrolyte 23 emitting from the nozzle while the workpiece was charged anodically. When the current flow was sensed by an ammeter 50 to be at 0.185 milliamp, the feed rate of the nozzle was reduced to 0.160"/min. and electrolytic material removal was started as shown in FIGS. 2 and 3 at the required electrical conditions, causing the electrolyte to glow at least incipiently. Material removal was continued until breakthrough occurred as shown in FIG. 4. At this point, as was described above, the current decreased to 50 milliamps as sensed by an ammeter 50 which in turn signaled the program control 52 to stop feed mechanism 54. With the power still on, the electrolytic material removal was allowed to continue for 4 seconds until complete penetration of the cavity was made as shown in FIG. 5 as determined experimentally by the time necessary to remove shelf 30 in FIG. 4. The current and electrolyte flow was then stopped and the feed was reversed as in FIG. 6 to withdraw the nozzle from the workpiece.

EXAMPLE 12

As was mentioned above, it was recognized that in the practice of the present invention ordinary alternating current can be used instead of direct current when the electrolyte is caused to manifest at least an incipient glow. Thus, a D.C. rectifier need not be included in support of the apparatus of this invention and less expensive power equipment such as a step-up transformer instead of a rectifier can be used.

In one example a 0.100" thick sheet of the previously described U 700 nickel base alloy was tested with both A.C. and D.C. at 500 volts and at a feed rate of 0.080"/min. within the scope of this invention. A 10% sulfuric acid aqueous solution was used as the electrolyte with a 0.017" I.D. nozzle, .400" long. The cathode material was Hastelloy C alloy having a nominal composition, by weight, of 15.5% Cr; 16% Mo; 3.75% W; 5.5% Fe with the balance Ni and incidental impurities. It has a cutting rate with the process of this invention virtually the same as that of U 700 alloy. With both A.C. and D.C. the current was about 250–300 milliamps. Penetration time for both A.C. and D.C., was about the same with a hole of .040" diameter resulting from D.C. and .026" diameter hole from A.C. About half the volume of material was removed by A.C. during the same penetration time. Thus adjustment of such variables as feed rate could compensate for lower volume removal to produce the same cavity. It should be noted, however, that loss of weight of the cathode was less than 0.1 gram resulting from A.C. operation. This is contrary to what would be expected from normal electrolytic A.C. operation.

A variety of materials which can be made conductive can be used as a workpiece in the practice of the present invention. Typical of such materials and the conditions under which they were successfully used in at least one instance as shown in the following Table III.

TABLE III

| Example | Wkpc. Mat'l | Power Volts[1] | Power Amps | Feed in./min. | Electrolyte Type | Electrolyte Avg. p.s.i. | Nozzle (in.) I.D. | Nozzle (in.) Length |
|---|---|---|---|---|---|---|---|---|
| 13 | Fe base | 460 | .13 | .110 | A | 60 | .005 | .400 |
| 14 | Ni base | 300 | | ([2]) | B | 250 | .006 | .400 |
| 15 | Ag base | 500 | .4 | .100 | A | 55 | .015 | .400 |
| 16 | Carbide | 480 | .6 | .100 | A | 55 | .013 | .400 |
| 17 | Zr base | 480 | .6 | .100 | A | 55 | .013 | .400 |
| 18 | Cu base | 500 | .2 | .100 | B | 50 | .008 | .400 |
| 19 | Co base | 540 | .9 | .120 | B | 65 | .016 | .450 |

[1] All d.c. except a.c. for Example 14.  [2] None.  A=14% hydrochloric acid aqueous solution.  B=10% sulfuric acid aqueous solution.

The workpiece materials in the above Table III were the following: Example 13—A.I.S.I. type 304 stainless steel; Example 14—Hastelloy X alloy nominally comprising, by weight, 0.1% C, 22% Cr, 1.5% Co, 9% Mo, 0.6% W, 18.5% Fe with the balance essentially Ni and incidental impurities; Example 15—silver alloy comprising, by weight, 90% Ag, 10% Cu; Example 16—Carboloy carbide grade 883 tool bit material; Example 17—zircalloy alloy nominally comprising, by weight, 1.5% Sn, 0.12% Fe, 0.1% Cr, 0.05% Ni, balance Zr; Example 18—oxygen free copper; Example 19—X-40 cobalt base alloy nominally comprising, by weight, 25% Cr, 10.5% Ni, 7.5% W, 0.5% C with the balance cobalt and incidental impurities.

By selection of the proper conditions of feed and types of electrolytes, while operating with a power input level which will produce and maintain a condition in the electrolyte at which the electrolyte will manifest at least an incipient glow, a variety of sizes and shapes of holes can be produced. This invention is particularly useful in producing holes or channels having a major dimension of 0.050″ or less and can operate at practical operational cutting rates of up to 0.2″/sec. or more. Holes as small as 0.001″ in diameter have been made with this invention. The electrolyte in such a case must be filtered carefully so that it is kept free of solids to avoid stoppage of the nozzle opening which must be of a still smaller size, for example, about 0.0007″.

Although the present invention has been described in connection with some specific examples and conditions, it will be reconized by those skilled in the art, particularly the art of electrochemistry and electrolytic processing, the variations and modifications of which this invention is capable. By the appended claims, it is intended to cover all such equivalent variations and modifications.

What is claimed is:

1. An electrolytic method for removing material from an anodic workpiece through the use of a hollow tool having a dielectric wall encasing an electrical cathode, the tool terminating in an electrolyte directing nozzle, comprising the steps of:
    positioning the tool and the workpiece one opposite the other;
    contacting the cathode with an electrolyte;
    directing the electrolyte from the cathode through the nozzle in a charged electrolyte stream toward and in contact with the anodic workpiece across an equilibrium gap;
    concurrently applying an electrical potential of sufficient intensity through the electrolyte stream so that the current passed between the cathode and the workpiece by the potential produces in the electrolyte stream a condition at least an incipient glow wherein the current-voltage relationship in the electrolyte is at least in the "Kellogg region"; and then
    moving the tool and the workpiece one toward the other at a rate effective to maintain at least an incipient glow, thereby removing material progressively from the workpiece and the region against which the stream of electrolyte is directed.

2. The method of claim 1 wherein material is removed from the workpiece to produce a cavity having a diameter of up to about 0.05 inch and the applied potential is at least 300 volts.

3. The method of claim 1 wherein the tool is first moved relative to the workpiece at a first rate while at the same time sensing the increase in electric current as a result of decreasing gap between the cathode and the workpiece until there is produced said incipient glow in the electrolyte stream; and second the tool is moved relative to the workpiece at a rate less than the first rate to maintain the incipient glow in the electrolyte stream thereby removing material progressively from the workpiece in the region against which the electrolyte stream is directed.

4. The method of claim 1 wherein the applied potential is from 300 to 1200 volts and the current is up to 4 amperes.

5. The method of claim 1 wherein the applied potential is from 400 to 800 volts and the current is up to 2 amperes.

References Cited

UNITED STATES PATENTS

| 2,741,594 | 4/1956 | Bowersett | 204—143 |
| 2,767,137 | 10/1956 | Evers | 204—143 |
| 3,067,114 | 12/1962 | Tiley et al. | 204—143 |
| 3,085,055 | 4/1963 | Bradley | 204—143 |
| 3,184,399 | 5/1965 | Schnable | 204—143 |
| 3,267,014 | 8/1966 | Sanders | 204—143 |

OTHER REFERENCES

Schnable et al.: Electrochemical Technology, July–August 1963, pp. 203–211.

Kellogg: J. of The Electrochemical Soc., vol. 97, No. 4, pp. 133–142, April 1950.

ROBERT K. MIHALEK, *Primary Examiner*.